(No Model.)

W. H. HOWARD.
BICYCLE TIRE REPAIRER.

No. 566,764. Patented Sept. 1, 1896.

WITNESSES.
J. L. Hendry
B. L. Marsden

INVENTOR
William H. Howard.

UNITED STATES PATENT OFFICE.

WILLIAM H. HOWARD, OF MALDEN, MASSACHUSETTS.

BICYCLE-TIRE REPAIRER.

SPECIFICATION forming part of Letters Patent No. 566,764, dated September 1, 1896.

Application filed April 29, 1896. Serial No. 589,599. (No model.)

*To all whom it may concern:*

Be it known that I, WILLIAM H. HOWARD, a citizen of the United States, residing at Malden, in the county of Middlesex and State of Massachusetts, have invented a Bicycle-Tire Repairer for Immediately Stopping the Flow of Air from a Punctured Pneumatic Tire, of which the following is a full, clear, and exact description, reference being had to the accompanying drawings, making part of this specification, in which—

Figure 1:
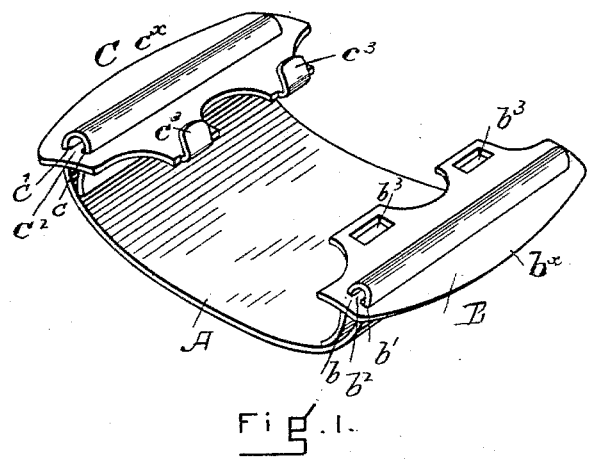
Figure 2:
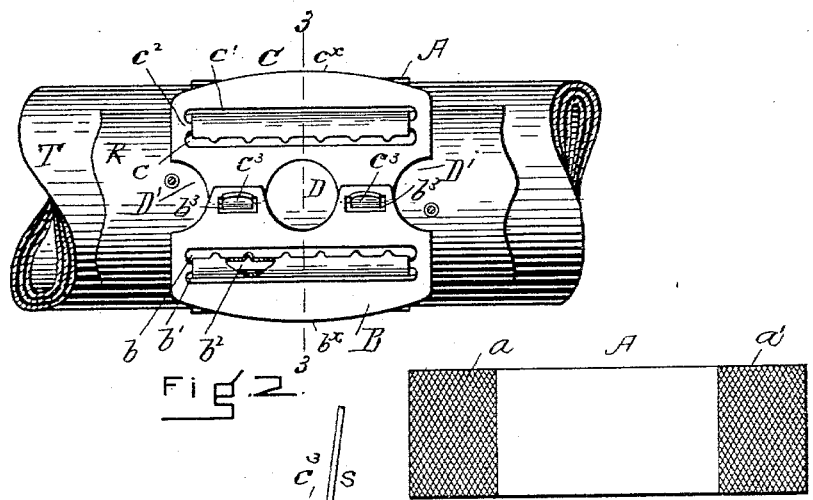
Figure 4:
Figure 3:
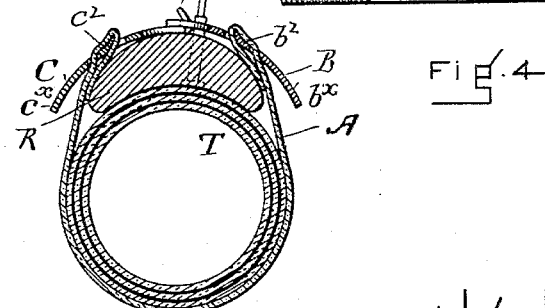

Figure 1 represents a perspective view of my bicycle-tire repairer. Fig. 2 represents my tire-repairer when in place, the band being stretched around the tire and the holders resting on the rim of the wheel. Fig. 3 is a cross-section on the line 3 3 of Fig. 2. Fig. 4 represents the encircling band with its reinforced ends.

Similar letters of reference indicate the same parts in the several figures of the drawings.

The object of my invention is to provide an article which is complete in itself and which can be quickly adjusted to fit any-sized tire and likewise be enabled to take up all its own slack if it becomes stretched from usage; also, to be applicable at any point of puncture, regardless of spokes or valve. I so construct my device as to provide means to easily apply and detach it while stretched to any degree of tension and am also enabled to replace an old band at any time by a new one without buying new holders, thus making a saving for the user.

A represents an encircling band, composed, preferably, of rubber, and having its ends $a$ $a'$ reinforced by one or more thicknesses of cloth cemented or otherwise secured thereto.

B C represent the holders to which the ends of the band A are secured by passing them through slots $b$ $b'$ and $c$ $c'$ cut in said holders. The outer portions $b^\times$ $c^\times$ of the holders B C slightly overlap the rim R and tire T of the wheel. The bars $b^2$ $c^2$ which separate the slots $b$ $b'$ and $c$ $c'$ are provided with sharp teeth for preventing the band A from slipping after being adjusted within the slots. The inner portion of the holder B is provided with slots $b^3$, and the inner portion of the holder C is provided with hooks $c^3$, adapted to engage the slots $b^3$, whereby the band A is held in place around the tire.

Fig. 1 represents the band A as having had its ends inserted from the under side of the holder up through the slots $b'$ $c'$, over the toothed bars $b^2$ and $c^2$, down through the slots $b$ and $c$, and being drawn tight in a reverse direction from that in which the teeth on said bars are inclined. These teeth enter the reinforced portions of the band A and firmly hold it at the desired point. It is the work of but an instant to still further push the band A up through the slots $b'$ $c'$ and pull the slack over the bars $b^2$ $c^2$ down through the slots $b$ and $c$ to adjust the band to any desired length. The band may be entirely freed from both holders, if desired, by simply reversing the aforesaid operation, namely, to push the ends of the band A up through and clear of slots $b$ and $c$, upon which the band will free itself from the bars $b^2$ and $c^2$, and can be pulled clear through slots $b'$ and $c'$. These simple operations make the band perfectly adjustable and make the said holders of permanent value, as new bands can be inserted as often as necessary.

Fig. 2 represents my invention in place around the tire and resting on the wheel-rim R after it has been adjusted to the proper length. When the hooks $c^3$ have been inserted in the slots $b^3$ to fasten the holders together, an orifice D and semicircular recesses D' are formed, which permit the holders to be clasped around the valve of the tire or spoke, the said orifice and recesses being of sufficient diameter for that purpose. The distance between the outer edges of the orifice D and the inner edges of the recesses D' is short enough to permit the holder to be clasped between the spokes, around the spokes or valve and between the valve and spokes, thus enabling the band to be applied to any point of possible puncture and with the desired tension.

In Fig. 3 the overhanging ends $b^\times$ and $c^\times$ of the holders B and C are shown in their relative positions when in actual use. The tension of the band A being very great when the band is being applied or removed it is necessary to have some means of quickly and easily getting hold of the device to apply it, as desired, and as the ends $b^\times$ and $c^\times$ protrude slightly they afford the desired means, and by their use the band at once becomes practicable and easy of use.

Emergency-bands are most naturally applied when the tire is somewhat collapsed, and to attain the best results the rider would adjust the length of the band to produce the desired tension, and then by grasping the holders at $b^\times$ and $c^\times$ by the thumb and forefinger readily and quickly fasten the band in place, which, upon the tire being fully expanded, would serve its purpose of stopping the leakage.

The band A being firmly held at the desired points across its entire width always furnishes an equal tension, which is necessary to accomplish the desired results. I do not wish to confine myself to particular kinds of material in the construction of this article, nor in the manner of holding the band A at its two ends, but in the aforesaid description have described ways and means for the best use of present needs. Instead of making both holders adjustable on the band A one only of said holders may be made adjustable, the band being immovably secured to the other holder.

What I claim as my invention, and desire to secure by Letters Patent, is—

1. A tire-repairer, comprising a band to encircle the tire, and holders on the ends of the band, formed of sheet-metal plates provided at their inner edges with interlocking fastenings and registering recesses and having finger-grasp extensions, $b^\times$, $c^\times$, at their outer edges beyond the ends of the band, substantially as set forth.

2. A tire-repairer, comprising a rubber band having reinforcing-strips secured to its ends, as at $a$ $a'$, and the holders having interlocking fastenings at their inner edges, and a pair of slots between the inner and outer edges of each holder through which the ends of the band are passed; the cross-bars, $b^2$, $c^2$, which separate the slots being provided with teeth which engage the reinforced ends of the strips and hold them from slipping, substantially as set forth.

3. A clasp or holder for tire-tighteners, consisting in the two sheet-metal plates B, C, having interlocking fastenings at their inner edges; said edges having registering recesses between and at opposite sides of the fastenings to form the openings D, D' D', for the valve and spokes, parallel slots $b$, $b'$, $c$, $c'$, in the said plates between their inner and outer edges; the cross-bars $b^2$, $c^2$, formed by said slots being provided with teeth, and the finger-grasp extensions $b^\times$ $c^\times$, at the outer edges of the plates, substantially as set forth.

Witness my hand this 27th day of April, A. D. 1896.

WILLIAM H. HOWARD.

In presence of—
J. L. HENDRY,
B. L. MARDEN.